United States Patent Office 3,470,122
Patented Sept. 30, 1969

3,470,122
COMPOSITIONS COMPRISING ETHYLENE-VINYL ACETATE COPOLYMER, FATTY ACID SALT, FATTY ACID AMIDE AND PARTICULATE MATERIAL
Lee R. Ridgeway, Cincinnati, Ohio, and Joseph Fischer, Urbana, Ill., assignors to National Distillers and Chemical Corporation, New York, N.Y., a corporation of Virginia
No Drawing. Filed Jan. 19, 1966, Ser. No. 521,524
Int. Cl. C08f *45/44, 47/14*
U.S. Cl. 260—23        6 Claims

ABSTRACT OF THE DISCLOSURE

A polyolefin composition including in combination an ethylene-vinyl acetate copolymer, a metal salt of a fatty acid, an amide of a fatty acid and a finely divided inert inorganic compound.

---

This invention relates to polyolefin compositions having improved slip and non-blocking properties. More particularly, the invention relates to ethylene/vinyl acetate copolymer compositions whose normally high film-to-film coefficient of friction is reduced by incorporating into said composition at least one metal salt in combination with at least one fatty acid amide and a finely-divided inert inorganic compound.

The use of low density polyethylene for film applications necessitated the development of improvements in certain of the film characteristics. To permit the use of polyethylene films on high speed bag making and other machinery, it was necessary to develop films having improved slip characteristics, that is, the ability of the film to slide smoothly and quickly over metal or other surfaces or over another layer of film. In addition, additives were used to prevent blocking, that is, the tendency of film to cling to itself on the roll and thus to resist separation by any peeling force. A suitable slip agent or combination of slip and anti-block agents in polyolefins will impart a controlled and desired level of slip to the film and will not have a deleterious effect on the optical properties of the product.

The blocking and slip tendencies of polyethylene films having been improved by the incorporation into the resin of various fatty acid amides, such as oleamides, stearamides, and the like.

The use of materials known to be effective mold release agents, e.g., metallic stearates, has not been feasible in the polyethylene film industry because of the limited compatibility of the polymer with foreign substances. Excessive plate-out on the surface of dies and rolls in fabricating equipment and the heavy surface layer of such deposits on the film are undesirable.

Inorganic silica compounds have been tried as anti-blocking agents with some degree of success; if, however, large amounts of the compound are used or if the particle size is too large, the haze of the film is increased.

Because of their inherent flexibility and elastomeric properties, ethylene/vinyl acetate copolymers present greater problems than polyethylene in producing films with adequate slip characteristics. Many copolymers of ethylene and vinyl acetate will produce films having excellent clarity, toughness, low temperature properties, and other desirable characteristics, but having a very strong tendency toward blocking. If the commonly used and accepted polyethylene slip and anti-block agents, e.g., oleamides or stearamides, are incorporated into the ethylene/vinyl acetate copolymer in the concentrations normally used, these additives are not effective. If it is attempted to remedy this by greatly increasing the amount of the fatty acid amide, the product tends to have a greasy feel and to exhibit undesirable wet blocking. In addition, the organic amides alone do not appear to impart sufficient anti-block properties to the copolymer films. If high concentrations of inorganic anti-block agents are used, the product becomes very hazy and loses its attractive transparency and optical sparkle.

Thus it has not been found possible to improve the slip and anti-block properties of ethylene/vinyl acetate copolymer films without impairing their other desirable properties by taking the best of the slip or anti-block compositions now used with polyethylene or by ether increasing or decreasing the constituents of the additive compositions.

It is, therefore, an object of this invention to provide an ethylene/vinyl acetate copolymer resin film composition having improved slip and anti-block characteristics.

An additional object is to provide an ethylene/vinyl acetate copolymer resin composition wherein film made therefrom has improved slip and anti-blocking characteristics and wherein other physical properties of the film, such as clarity, permeability, sealability, and the like, are not adversely affected.

A further object of this invention is to provide ethylene/vinyl acetate copolymer resins that can be converted into films by standard processing techniques, such as are used to make tubular or cast film, and to impart thereto a balance of slip and anti-block characteristics without deleterious effect on the other desirable characteristics, such as the optical properties.

Other objects will become apparent from the following detailed description.

In accordance with this invention, plastic compositions particularly solid copolymers of ethylene and vinyl acetate, are given improved slip and anti-block properties by incorporating into such compositions a small amount, based upon the weight of said plastic compositions, of a metal salt of a fatty acid, a fatty acid amide, and a finely-divided inert inorganic compound.

The amounts of metal salt, fatty acid amide, and inorganic compound used may be varied over a wide range, depending upon the desired improvement in slip and anti-block properties. In general, about 0.01 to about 4.0 percent of the metal salt plus about 0.1 to about 0.8 percent of the fatty acid amide and about 0.01 to 2.5 percent of the inorganic compound, based on the weight of the polyolefin composition, will give satisfactory results. Preferably about 1.0 to 2.0 percent of the metal salt, about 0.1 to 0.2 percent of the fatty acid amide, and about 0.05 to 0.2 percent of the inorganic compound are used; if desired, however, less than 0.01 and more than 4 percent of the metal salt, less than 0.1 and more than 0.8 percent of the fatty acid amide, and less than 0.01 and more than 2.5 percent of the inorganic compound can be used without deleterious results.

The improved plastic compositions embodied herein can be prepared by any of several suitable methods known in the art for providing a uniform mixture of a plastic and additive materials to impart a desired property. Such methods, with reference to this invention, include the addition of the stated amides, metal salts, and inorganic compounds as a solid, in solution in an inert solvent, or as a slurry in a non-solvent to the plastic in either dry fluff or molding powder form, followed by drying and tumbling. The stated amide, salt, and inorganic compound additives can also be incorporated into the plastic by melt blending the ingredients in conventional apparatus, such as a Banbury mixer, heated rolls, etc. The salt, the amide, and the inorganic compound can be added to the plastic composition separately, or they can be premixed and the mixture of metal salt, amide, and inorganic compound added to the plastic composition.

Suitable metal salts are those of saturated fatty acids having from about 12 to 22 C atoms, such as, for example, zinc laurate, zinc palmitate, zinc behenate, zinc stearate, cerium stearate, dibasic lead stearate, aluminum stearate, calcium stearate, and combinations thereof. Fatty acid amides that give good results when combined with the metal salts are the amides of fatty acids having from about 12 to 22 C atoms, such as, for example, laurylamide, palmitylamide, oleylamide, stearylamide, linoleylamide, erucylamide, behenylamide, and mixtures of these.

In general the finely-divided inert inorganic compound of this invention is silica. Other materials, however, such as magnesium silicate, calcium silicate, calcium carbonate, or mixtures thereof, can be used successfully. The compound preferably has an average particle size within the range of about 1 to 6 mcirons; it is, however, possible to use compounds having an average particle size as small as 0.01 micron or as large as 10 microns. The compositions of this invention contain essentially a film-forming copolymer of ethylene and vinyl acetate, at least one metal salt, at least one fatty acid amide, and at least one finely-divided inert inorganic compound. Other conventional polyolefin film resin components, such as lubricants, antistatic agents, antioxidants, colorants, and so forth, can be added to the composition, provided, however, that the added amount of these ingredients is insufficient to alter substantially the slip and anti-blocking properties of the compositions.

In order to illustrate the marked improvement in slip properties and anti-blocking properties imparted to plastic compositions by the practice of this invention, cast films were prepared from a solid ethylene/vinyl acetate copolymer and from a solid ethylene/vinyl acetate copolymer to which had been added at least one metal salt, at least one fatty acid amide, and at least one inorganic compound and tested as follows:

Roll openability

This test evaluates the ease of unrolling a roll of cast film stored at room temperature and is determined as a function of how the film opens or falls away from the roll. Zero roll openability is defined as complete blocking, that is, it is not possible to separate the film from the roll without exerting a force or tearing action. At 100 percent roll openability, the film falls freely from the roll as the roll is unwound. Fifty percent openability is defined as follows: 10 feet is divided by the thickness of the film in mils. This length is allowed to hang free as the roll is unwound. If the weight of this free-hanging material is more than enough to unroll the film, the roll openability is greater than 50 percent. If not, the roll openability is less than 50 percent. In this test a roll openability of 70 percent or greater is regarded as acceptable.

Jungle block

The jungle block openability test is determined by placing a small stack of film, usually 20 sheets or layers, between two steel plates, 8" by 14" and weighing 11 pounds and 11 ounces. The stack is placed in an oven at 100° F. for a week. Samples are then removed, allowed to cool, and the ease of openability is measured. A jungle block of greater than 25 percent is considered acceptable. Film which falls open between the fingers when picked up is considered to have 100 percent openability, whereas film which cannot be opened when worked between the fingers has zero openability.

Extent mottled

This is a qualitative test used to rate the unevenness or blotchiness of the film. It is rated, generally by a panel of three, as very heavy, heavy, medium, slight, very slight, and none. A rating of medium is regarded as acceptable for most applications.

The following data illustrate the improvement in slip and anti-blocking properties imparted to a 4-mil thick film by the incorporation of at least one metal salt, at least one fatty acid amide, and at least one inorganic compound in the ethylene/vinyl acetate copolymer composition having a melt index of 1.5 and a density of 0.937 g./cc. Included for comparative purposes are results of tests made on films prepared from an ethylene/vinyl acetate resin plus only one or two of the three additives required for this invention.

TABLE

| Run No. | Additive | Amount | Roll openability, percent 1 week | Roll openability, percent 1 month | Jungle block, percent | Haze, percent | Extent mottled |
|---|---|---|---|---|---|---|---|
| 1 | None | 0 | 25 | 25 | 25 | 1.5 | Slight. |
| 2 | Zinc stearate<br>Erucamide | 2%<br>2,000 p.p.m. | 70 | 75 | 25 | 3.0 | Medium. |
| 3 | Zinc stearate<br>Behenylamide | 2%<br>4,000 p.p.m. | 76 | 70 | 25 | 2.4 | Do. |
| 4 | Zinc stearate<br>Super floss [1] | 2%<br>1,000 p.p.m. | 82 | 68 | 25 | 3.0 | Do. |
| 5 | Zinc stearate<br>Erucamide<br>Behenylamide<br>Super floss | 1%<br>1,000 p.p.m.<br>1,000 p.p.m.<br>1,000 p.p.m. | 72 | 73 | 26 | 1.9 | Slight. |
| 6 | Zinc stearate<br>Erucamide<br>Super floss | 2%<br>1,000 p.p.m.<br>500 p.p.m. | 70 | 77 | 28 | 1.7 | Medium. |
| 7 | Zinc stearate<br>Erucamide<br>Super floss | 1%<br>1,000 p.p.m.<br>2,000 p.p.m. | 83 | 80 | 33 | 1.5 | Do. |
| 8 | Zinc stearate<br>Amides mixture [2]<br>Super floss | 2%<br>1,000 p.p.m.<br>1,000 p.p.m. | 82 | 80 | 37 | 1.6 | Do. |

[1] Diatomaceous earth product.
[2] A mixture of 91 percent by weight of oleamide, 6 percent of stearamide, and 3 percent of linoleamide.

Additional runs were made using combinations of various amounts of silica with various amounts of zinc laurate, zinc palmitate, or zinc behenate with various amounts of oleylamide, linoleylamide, palmitylamide, or laurylamide. The results obtained were comparable to those in the table using zinc stearate with behenylamide or erucylamide.

From these data it can be seen that in general the use of a combination of at least one metal salt of a fatty acid with at least one fatty acid amide with at least one finely-divided inert inorganic compound results in a film that has both improved slip and anti-blocking properties with no detrimental effect on the appearance and optical properties of the film. In addition to giving a product film that is superior to one made from a copolymer resin containing no slip additive (Run 1), the copolymer resin compositions of this invention yield films that are superior to those made from resin compositions containing only two of the three additives required (Runs 2, 3, and 4).

As is apparent from the foregoing specification, the compositions and method of the present invention can be embodied with various alterations and modifications that may differ particularly from those that have been de-

What is claimed is:

1. A polyolefin composition having improved slip and anti-blocking properties comprising an ethylene vinyl acetate copolymer, an amount effective to improve the slip tendencies of said copolymer of at least one metal salt of a saturated fatty acid having about 12 to 22 C atoms, at least one amide of a fatty acid having about 12 to 22 C atoms and at least one finely divided inert inorganic compound having a particle size in the range of about 0.1 to 10 microns.

2. The composition of claim 1 wherein the metal salt is present in an amount ranging from about 0.01 to about 4.0 percent, based on the weight of the copolymer; the amide of the fatty acid is present in an amount ranging from about 0.1 to about 0.8 percent, based on the weight of the copolymer; and the finely-divided compound is present in an amount ranging from about 0.01 to about 2.5 percent, based on the weight of the copolymer.

3. The composition of claim 1 wherein the metal salt is selected from the group consisting of zinc laurate, zinc palmitate, zinc behenate, zinc stearate, calcium stearate, dibasic lead stearate, cerium stearate, aluminum stearate, and mixtures thereof; the amide of the fatty acid is selected from the group consisting of erucylamide, oleylamide, behenylamide, stearylamide, linoleylamide, laurylamide, palmitylamide, and mixtures thereof; and the finely-divided compound is diatomaceous earth having an average particle size in the range of about 1 to 6 microns.

4. The composition of claim 1 wherein the finely-divided inert organic compound is silica.

5. A composition having improved slip and anti-block properties comprising an ethylene/vinyl acetate copolymer; about 1.0 to 2.0 percent, based on the weight of the copolymer, of zinc stearate; about 0.1 to 0.2 percent, based on the weight of the copolymer, of erucylamide; and about 0.05 to 0.2 percent, based on the weight of the copolymer, of diatomaceous earth having an average particle size of about 1 to 6 microns.

6. The composition of claim 1, wherein the finely-divided inert inorganic compound has a particle size in the range of about 1 to 6 microns.

References Cited

UNITED STATES PATENTS

| | | | |
|---|---|---|---|
| 2,462,331 | 2/1949 | Myers | 260—23 |
| 2,938,879 | 5/1960 | Mock et al. | 260—32.6 |
| 2,956,035 | 10/1960 | Mock | 260—23 |
| 3,028,355 | 4/1962 | Toy et al. | 260—41 |
| 3,205,190 | 9/1965 | Braus et al. | 260—32.6 |
| 3,324,060 | 6/1967 | Scopp et al. | 260—23 |
| 3,326,840 | 6/1967 | Ross et al. | 260—32.6 |
| 3,330,796 | 7/1967 | Mock et al. | 260—32.6 |
| 3,362,839 | 1/1968 | Weindel | 106—270 |

DONALD E. CZAJA, Primary Examiner

R. R. WHITE, Assistant Examiner

U.S. Cl. X.R.

260—28.5, 32.6, 41